United States Patent
Allis

(10) Patent No.: US 8,365,683 B2
(45) Date of Patent: Feb. 5, 2013

(54) AQUARIUM STRUCTURE

(75) Inventor: Anthony Allis, Bronx, NY (US)

(73) Assignee: Mag-Life LLC, Scarsdale, NY (US)

( * ) Notice: Subject to any disclaimer, the term of this patent is extended or adjusted under 35 U.S.C. 154(b) by 54 days.

(21) Appl. No.: 12/826,018

(22) Filed: Jun. 29, 2010

(65) Prior Publication Data

US 2011/0011348 A1    Jan. 20, 2011

Related U.S. Application Data

(60) Provisional application No. 61/222,348, filed on Jul. 1, 2009.

(51) Int. Cl.
*A01K 63/00* (2006.01)

(52) U.S. Cl. .................................. 119/245

(58) Field of Classification Search .......... 119/245–250; 52/306
See application file for complete search history.

(56) References Cited

U.S. PATENT DOCUMENTS

| | | | |
|---|---|---|---|
| 3,921,583 A | 11/1975 | De Shores | |
| 3,941,247 A * | 3/1976 | Cripe | 206/511 |
| 4,050,605 A * | 9/1977 | Wakana et al. | 220/565 |
| 4,628,652 A | 12/1986 | Wefels | |
| 4,984,403 A | 1/1991 | Zarwell | |
| 5,038,542 A * | 8/1991 | Kline | 52/306 |
| 5,083,528 A | 1/1992 | Strong | |
| 5,365,886 A | 11/1994 | Frost, Jr. | |
| 5,575,236 A * | 11/1996 | Pogue et al. | 119/6.5 |
| 2005/0132971 A1 * | 6/2005 | Sulski | 119/246 |

OTHER PUBLICATIONS

International Search Report dated Sep. 16, 2010 in corresponding PCT application No. PCT/US2010/040619.

International Preliminary Report on Patentability dated Jul. 5, 2011 issued in corresponding PCT International Application No. PCT/US10/040619.

* cited by examiner

*Primary Examiner* — Rob Swiatek
*Assistant Examiner* — Ebony Evans
(74) *Attorney, Agent, or Firm* — Ostrolenk Faber LLP

(57) ABSTRACT

An aquarium which includes a block shaped tank with projecting studs or posts on one face and aligned openings on an opposite face allowing the tanks to be arranged in any desired configuration by interlocking the tanks via the posts of one tank interlocking with the openings of another tank.

6 Claims, 8 Drawing Sheets

AQUARIUM STRUCTURE

CROSS-REFERENCE TO RELATED APPLICATIONS

This application is based on and claims the benefit of U.S. Provisional Application No. 61/222,348, entitled "CONDO BETA TANK," filed Jul. 1, 2009, the entire disclosure of which is incorporated by reference herein.

BACKGROUND OF THE INVENTION

The present invention relates generally to aquariums and, more particularly, to new and improved aquarium structures Most aquariums are single structures that are either mounted on a stand or wall mounted. To segregate fish or provide different environments requires a plurality of aquariums. If stand mounted, the arrangement is limited to a linear array. Wall mounting, on the other hand, while permitting flexibility in the arrangement is very costly to initially set up and even more costly to change the arrangement after initial set up.

SUMMARY OF THE INVENTION

It is a general object of the present invention to provide an improved aquarium structure that enables a plurality of aquariums to be simply and inexpensively arranged in almost any desired arrangement.

This and other objects of the invention are achieved by an aquarium comprising a block shaped tank with projecting studs or posts on one face and aligned openings on an opposite face allowing the tanks to be arranged in any desired configuration by interlocking the tanks via the posts of one tank interlocking with the openings of another tank.

Other aspects, features and advantages of the present invention will become apparent from the following description of the invention that refers to the accompanying drawings.

DETAILED DESCRIPTION OF THE INVENTION

Figure 1:
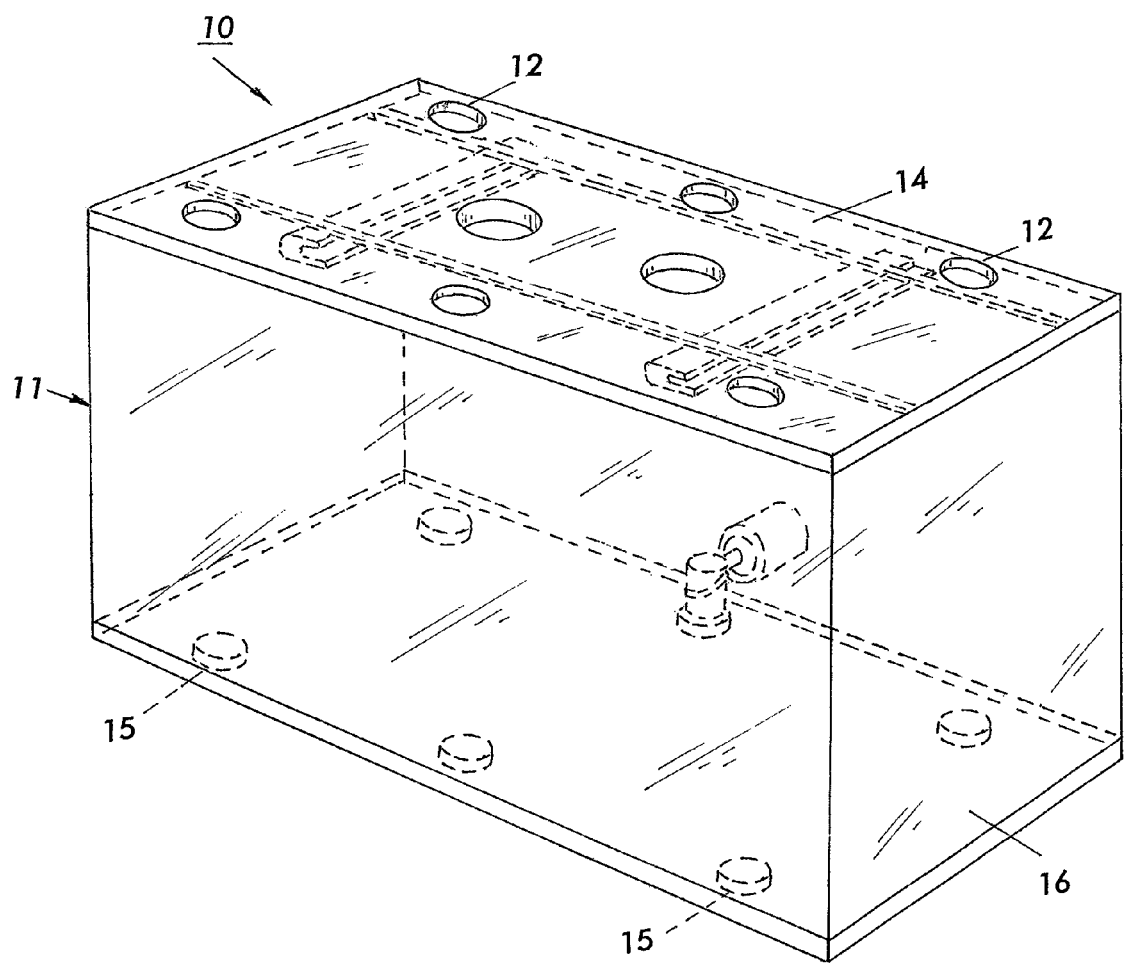
FIG. 1 is perspective view of an aquarium illustrating certain features of the present invention.

Referring now to the drawings and, in particular, referring to FIG. 1, there is shown an embodiment of an aquarium 10 illustrating certain features of the present invention. The aquarium 10 includes a block shaped tank 11 with a plurality of openings 12 on one face 14 and aligned projecting studs or posts 15 on an opposite face 16 allowing the tanks to be arranged in any desired configuration by interlocking the tanks via the posts of one tank interlocking with the openings of another tank as shown in FIGS. 5-12. In the embodiment described herein there are six holes 12 on the face 14 and six aligned studs 15 on the face 16.

Figure 2:
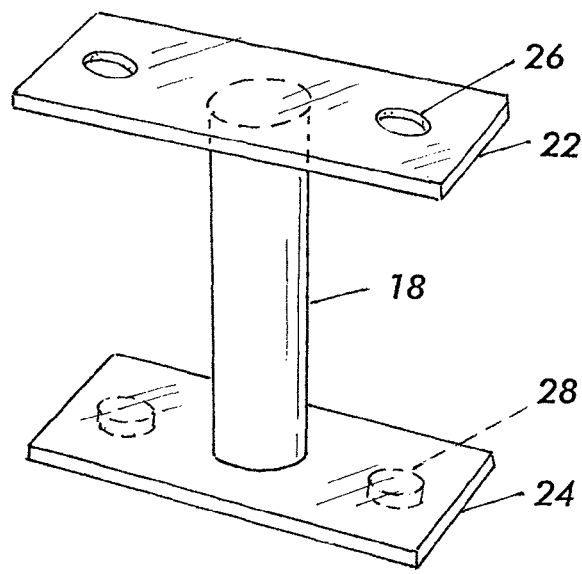
FIGS. 2-4 are views of different legs used with the aquarium of FIG. 1.
Figure 3:
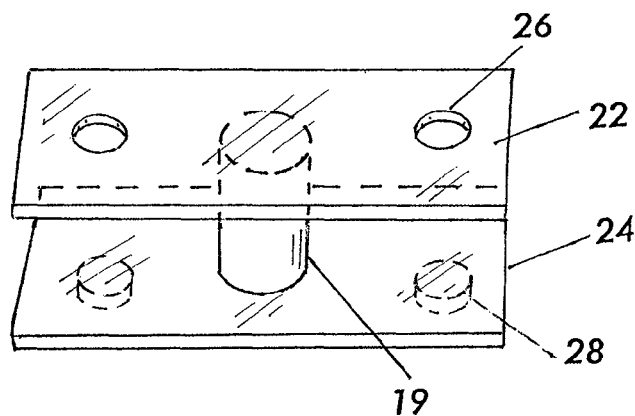
Figure 4:
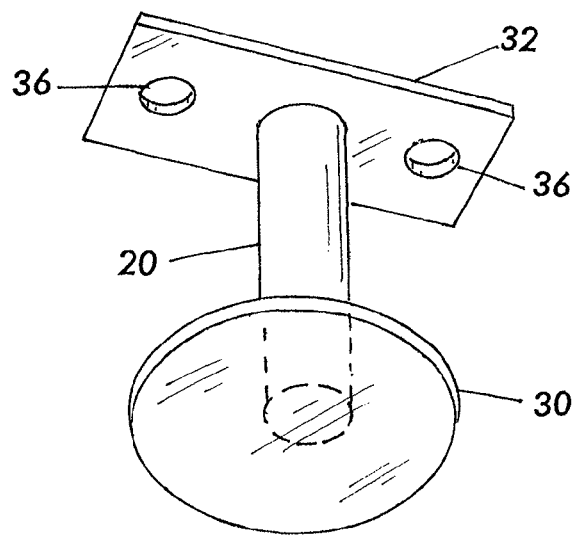
Figure 5:
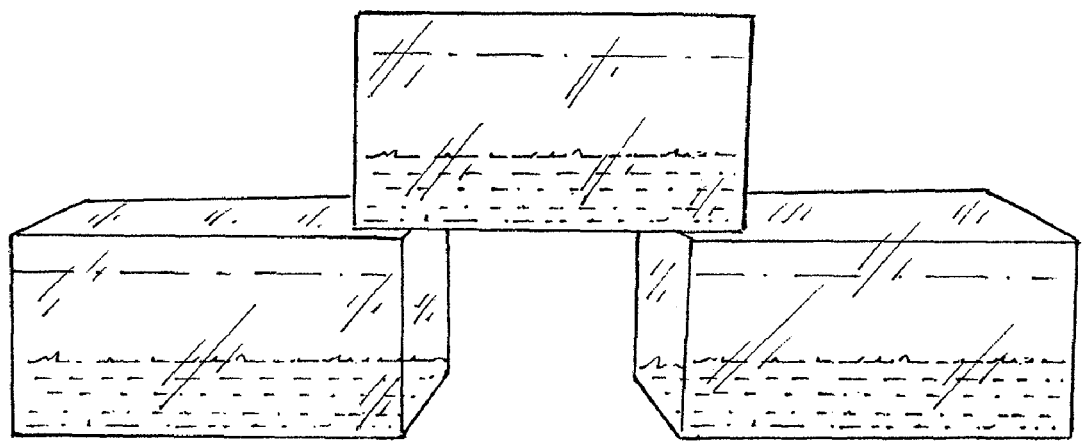
FIGS. 5-12, show a plurality of aquariums of the structure shown in FIG. 1 interlocked in different arrangements with the legs of FIGS. 2-4.
Figure 6:
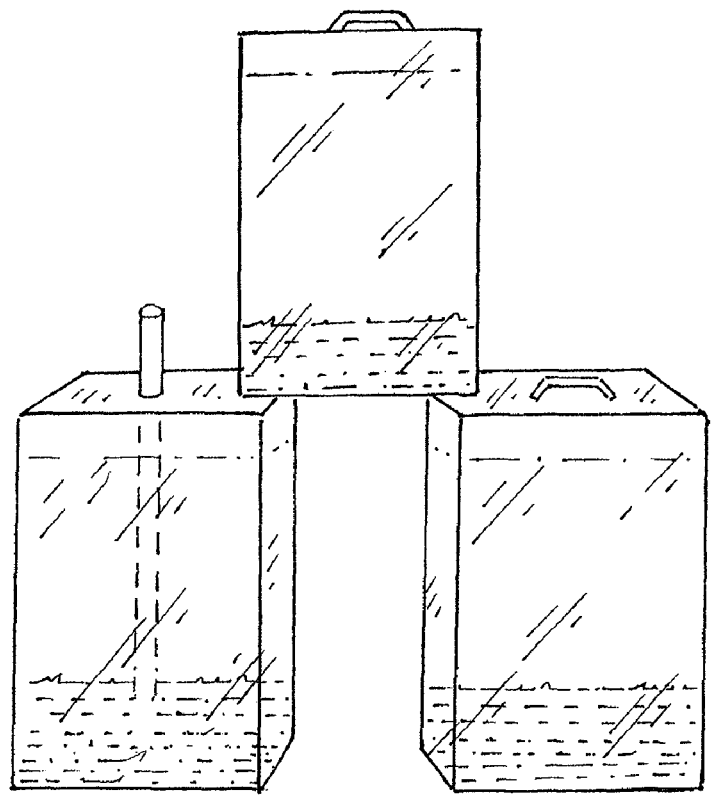
Figure 7:
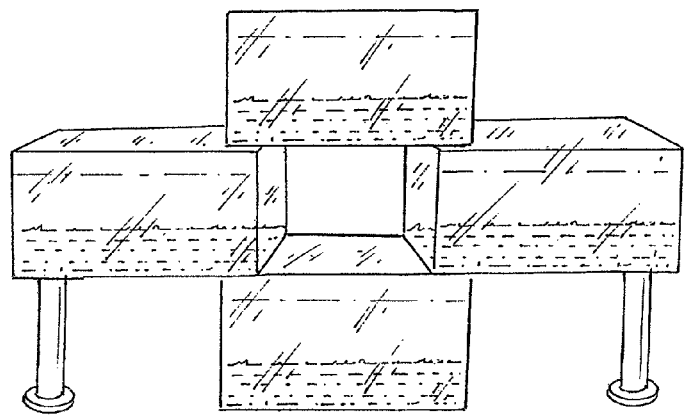
Figure 8:
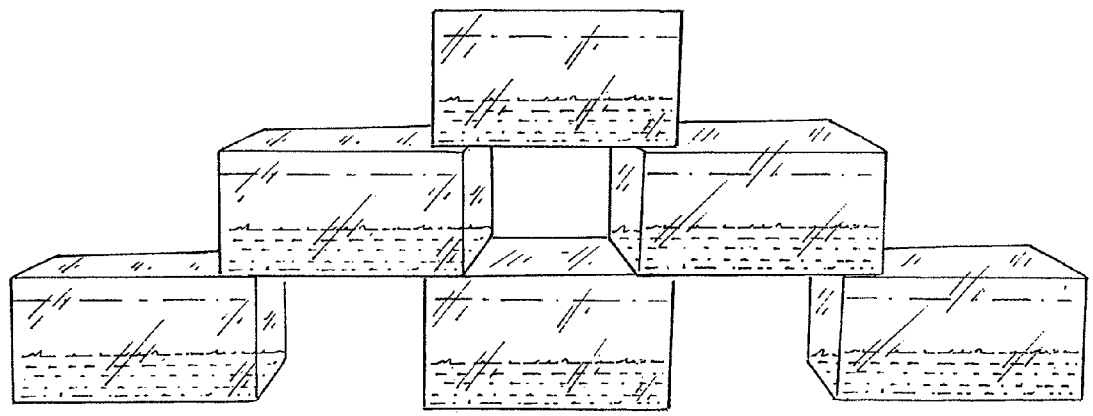
Figure 9:
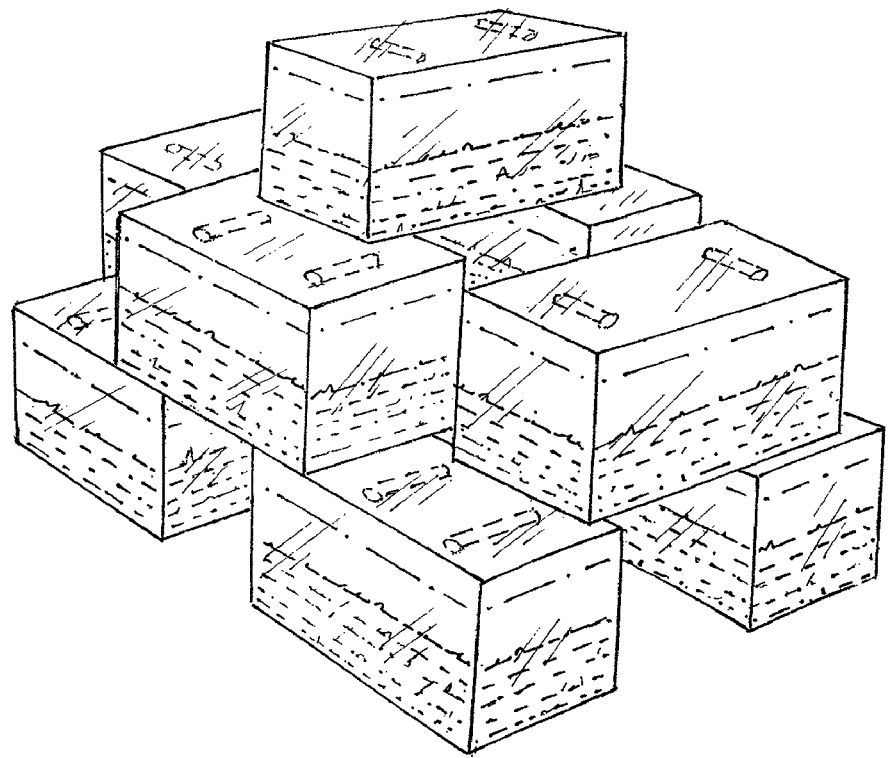
Figure 11:
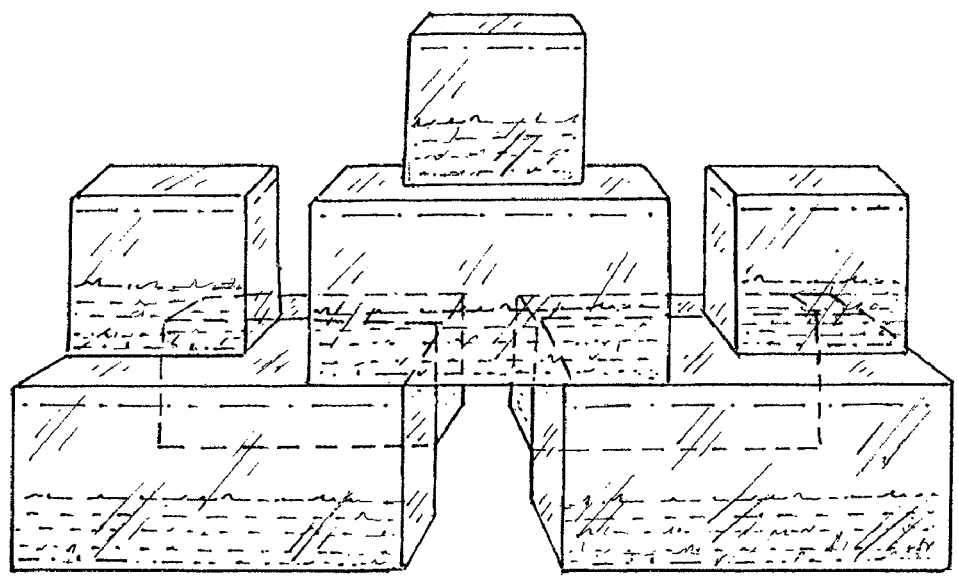
Figure 10:
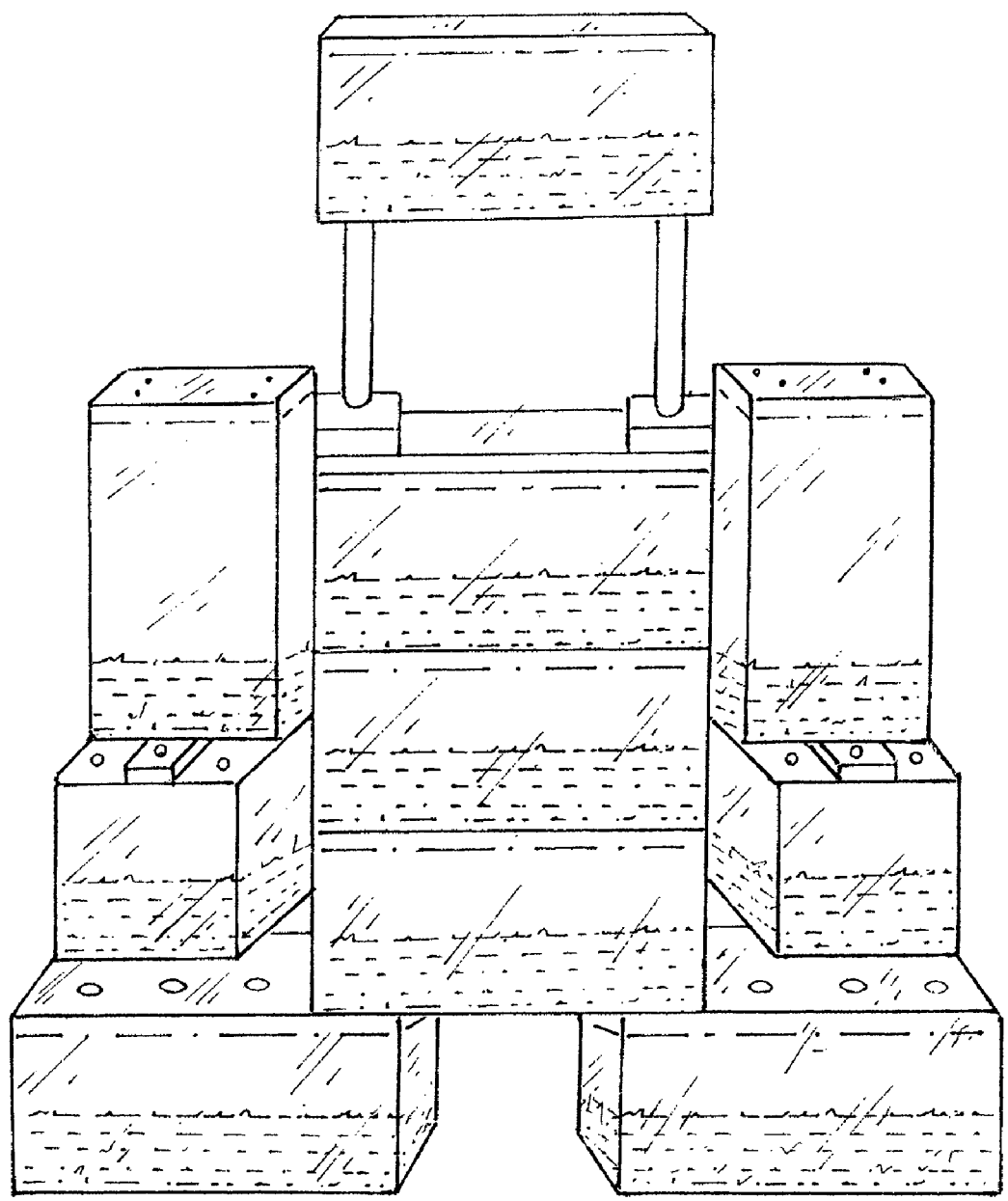
Figure 12:
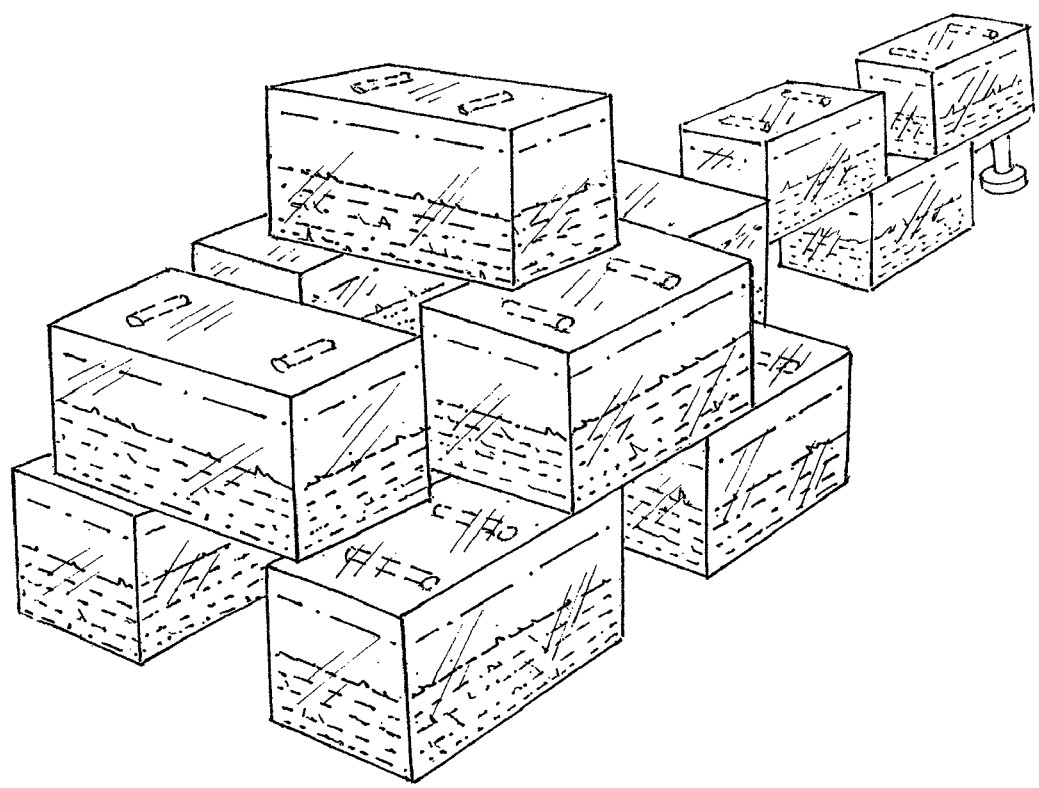
Figure 13:
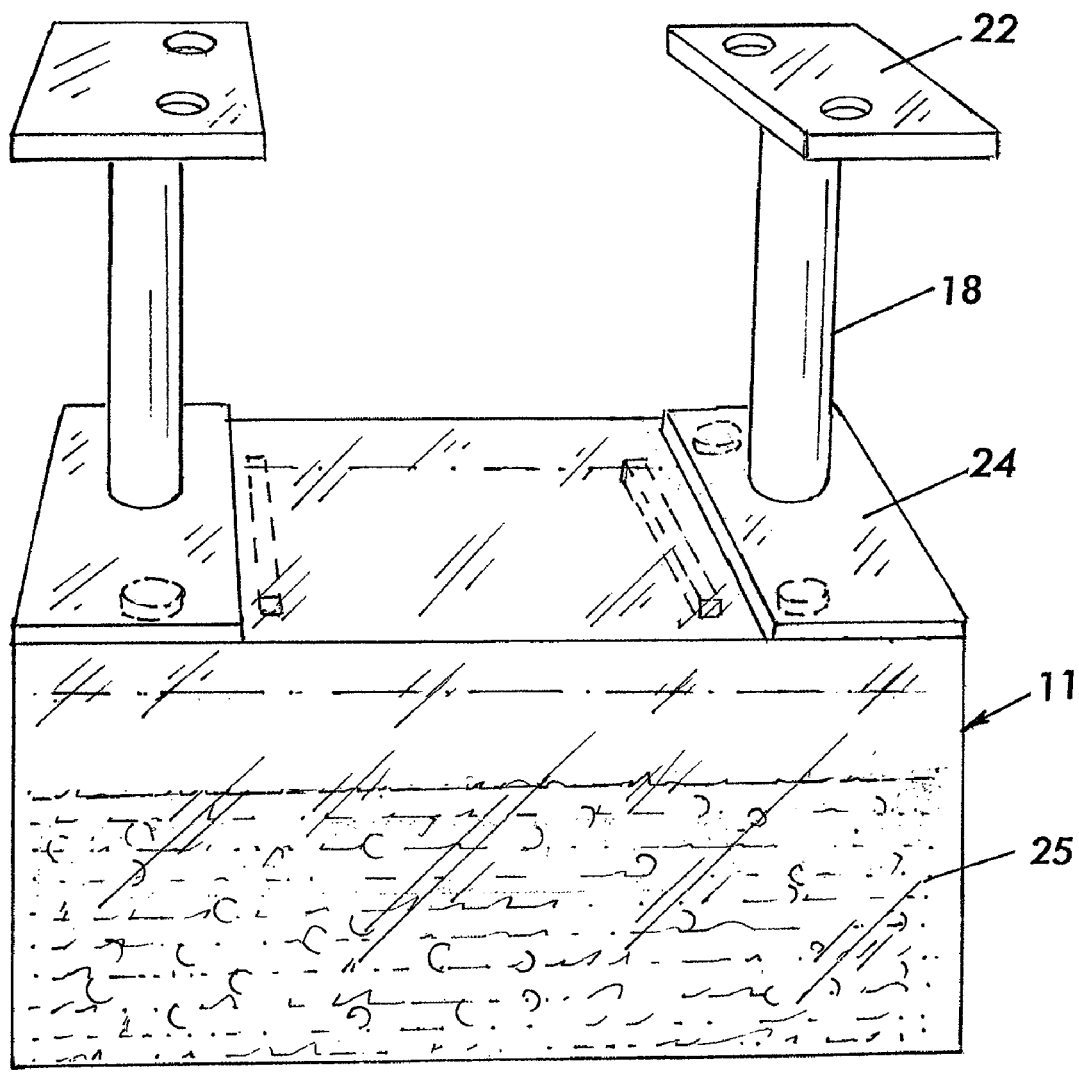
FIG. 13 illustrates one of the legs of FIGS. 2-4 connected to the aquarium of FIG. 1.

Referring now to FIGS. 2-4 there are shown legs 18, 19 and 20 for interconnecting the tanks in spaced relationship. Each of the legs 18 and 19, which are identical except for their lengths, has flanges 22 and 24 at opposing ends. Each flange 22 includes a pair of openings 26 sized and spaced to interlock with projecting studs 15 on the facing side of an adjacent vertically spaced tank. Each of the flanges 24 has a pair of studs 28 sized and spaced to interlock with openings 12 on facing sides of adjacent vertically spaced tanks. See, for example, FIG. 13.

The leg 20 is a ground leg for supporting a tank in spaced relationship to a flat surface and includes a flange 30 at one end and a flange 32 at its opposite end. The flange 32 includes a pair of openings 36 sized and spaced to interlock with projecting studs 15 on the facing side of an adjacent vertical tank. See, for example, FIG. 13.

In use, each of the aquariums includes a substrate 22. The substrate 22 may be any type material, such as sand, pebbles, crushed coral, dolomite, or crushed glass.

Advantageously, the material selected for the substrate 22 should have a density slightly greater than that of water so that the particles are easily moved by the water. As a result the substrate 22 essentially has neutral buoyancy. Similarly, the particles should have a size and shape that promote easy movement. This, combined with the neutral buoyancy, causes the substrate 22 to function as a fluidized-bed in which the up flow of water causes the substrate 22 media to act as a fluid.

The substrate 22 hereinafter referred to as "the neutral buoyancy substrate 22" or the "NBS" also eliminates another problem, it will not have algae grow on it due to the fact that it is in motion. Since the substrate 22 remains in motion, algae cannot take hold. What is on top of the pile today is covered tomorrow and never forms algae.

The neutral buoyancy substrate 22 can be made to look exactly like the painted gravel widely used today. It may also look like natural pebbles, crushed coral or just about any other substrate 22. In fact it not only can duplicate the look of natural substrate 22 but it can also be translucent in any color or it can be made in a marbleized natural polished pebble. Experiments with neutral buoyancy substrate 22 with slight variations in density led to the neutral buoyancy substrate 22 arranging itself within the currents of the tank 11. When the lighter density version had a unique color to the higher density they arranged themselves with the lighter color in the lowest current regions and the denser collecting in the areas with higher currents.

An SRS (Sediment Removal System) may added by adding a sediment drain hole with a rubber plug at the bottom of the front of a tank or under it. The plug completes the SRS system in conjunction with the Neutral buoyancy substrate with the spacing so the dirt collects at the bottom. Another element may be added to it by including a set of magnets to agitate the substrate and move the collected sediment into the moving water with the tank held so the plug is at the lowest point to remove all the collected sediment. The outside magnet is linked through the tank wall to the magnet inside the tank. Then, if the tank is held tilted with the drain at the bottom, the inside magnet agitates the substrate by gently moving the outside magnet along the bottom of the tank to get the effect of the stirrer. This can be done with the tank tilted in the sink with the SRS drain at the lowest point or any number of other ways. All the methods rely on the properties of the NBS.

The concepts of SRS and Neutral buoyancy substrate are further described in U.S. Pat. Nos. 7,249,571 and 7,430,989, and U.S. Patent Applications 20050076851, 20070295654 and 20080217225, each of which is hereby incorporated in its entirety by reference.

The term "aquarium" as used herein means any tank, bowl, or other water-filled enclosure in which aquatic animals and/or plants are kept.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A kit for an aquarium, comprising:
   a block shaped tank with projecting studs on one face and aligned openings on an opposite face; and
   a plurality of legs each of which has flanges at opposing ends, one of the flanges includes a pair of openings sized and spaced to interlock with the projecting studs on the tank and the opposite flange has a pair of studs sized and spaced to interlock with the openings on the opposite side of the tank.

2. A kit according to claim 1, wherein at least two of the legs are of different lengths.

3. A kit according to claim 1, further including a leg having one end adapted to rest on a horizontal surface.

4. A plurality of interlocked aquariums, comprising:
   a plurality of block shaped tanks, each having projecting studs on one face and aligned openings on an opposite face with the studs of one tank interlocking with openings of another tank; and a plurality of legs each of which has flanges at opposing ends, one of the flanges including a pair of openings sized and spaced to interlock with projecting studs on a facing side of an adjacent vertically spaced tank and the opposite flange has a pair of studs sized and spaced to interlock with the openings on a facing side of an adjacent vertically spaced tank.

5. A plurality of aquariums according to claim 4, wherein at least two of the legs are of different lengths.

6. A plurality of aquariums according to claim 5, further including a leg having one end adapted to rest on a horizontal surface.

* * * * *